United States Patent [19]

Späne et al.

[11] Patent Number: 4,806,169
[45] Date of Patent: Feb. 21, 1989

[54] PROCESS FOR THE REMOVAL OF SOLID DEPOSITS FROM WATER SUPPLY INSTALLATIONS

[75] Inventors: Rainer Späne; Thomas Kötzsch, both of Rheinfelden, Fed. Rep. of Germany

[73] Assignee: R. Spane GmbH & Co. KG, Rheinfelden, Fed. Rep. of Germany

[21] Appl. No.: 741,245

[22] Filed: Jun. 4, 1985

[51] Int. Cl.$^4$ ............................................... C23G 1/02
[52] U.S. Cl. ......................................... 134/3; 134/27; 134/41; 134/28; 210/696; 210/738; 252/80; 15/104.15
[58] Field of Search ................. 134/21.1, 21.11, 21.12, 134/21.16, 41, 27, 28, 3; 210/696, 738, 153, 542, 774; 406/45; 336/336, 338; 15/104.5; 116/17.1; 252/80

[56] References Cited

U.S. PATENT DOCUMENTS

| | | | |
|---|---|---|---|
| 3,085,929 | 4/1963 | Haslam | 210/774 |
| 3,649,194 | 3/1972 | Glanville | 134/3 |
| 3,682,702 | 8/1972 | Hnizda | 134/41 |
| 3,817,859 | 6/1974 | Tate | 210/696 |
| 3,905,907 | 9/1975 | Shiga | 252/79.4 |
| 4,009,115 | 2/1977 | Binns | 134/3 |
| 4,022,703 | 5/1977 | Bakes et al. | 134/3 |

FOREIGN PATENT DOCUMENTS

| | | |
|---|---|---|
| 974400 | 12/1960 | Fed. Rep. of Germany . |
| 2364162 | 7/1974 | Fed. Rep. of Germany ........ 134/41 |
| 2034005 | 12/1970 | France . |
| 2065380 | 7/1971 | France . |

OTHER PUBLICATIONS

Chemical Abstracts, vol. 89, (1978) p. 219.
Laid Open Japanese Patent Application 55,25754 (Abstract).
Chemical Abstracts, vol. 89 (1978) p. 219.
Vom Wasser. 55 Band (1980) S, 159–177.
Prevention of Scaling and Corrosion of Titanium Alloy Heat Exchanger Tubes, pp. 12–15, Allan et al.
Chemical Abstracts, vol. 89, (1976), p. 110.

*Primary Examiner*—H. M. S. Sneed
*Assistant Examiner*—Sharon T. Cohen
*Attorney, Agent, or Firm*—Burns, Doane, Swecker & Mathis

[57] ABSTRACT

A process for the removal of solid deposits, especially calcium-, iron-, manganese-containing incrustations and mixtures thereof, from water supply installations wherein an aqueous solution comprising a mineral acid, preferably hydrochloric acid corresponding to a normality of the solution of 0.001 N to 6 N, and hydrogen peroxide in a proportion of 0.05 to 20% by weight of the total solution, is applied to the interior surfaces of the installations by, for example, spraying or rinsing.

7 Claims, No Drawings

PROCESS FOR THE REMOVAL OF SOLID DEPOSITS FROM WATER SUPPLY INSTALLATIONS

BACKGROUND OF THE INVENTION

1. Field of the Invention

The present invention relates to a process used for the treatment of the interior surfaces of water supply installations by the removal of solid deposits. More particularly, the present invention is a treating solution and a process for its use, the latter comprising applying an aqueous solution of a mineral acid and hydrogen peroxide to the interior surface of water supply installations, so as to remove calcium-, iron-, and manganese-containing incrustations.

Installations that supply utility or potable water require periodic cleaning of deposits that continuously build up on their interior surfaces. (The term "interior surfaces" includes every portion of the installations that is in contact with water.) These deposits comprise substances dissolved in water that originates from natural sources, and usually consist of iron-, calcium-, and manganese-containing depositions in their carbonate or oxide form. Furthermore, these deposits may comprise ocherous and sinter deposits formed by microorganisms present in soil, especially microorganisms known as iron and manganese bacteria. Incrustations of the ocherous and sinter type possess upon aging considerable resistance to mechanical and chemical attack, and exhibit further resistive power with increasing manganese content.

Installations for the supply of water within the meaning of the present application are, in particular, communal or private installations for the transportation, treatment, and storage of potable and utility water. These installations include tanks, reservoirs, wells, piping, filters, meters, processing plants, aqueducts, towers, tunnels, conduits, etc. In such installations the water is usually at environmental or ground water temperature.

Even though these installations historically consisted of metal or metal parts, presently, synthetic materials are utilized. For example, water storage tanks usually are typically concrete basins coated with a chlorinated rubber.

2. Description of the Prior Art

In the prior art, unsuccessful attempts were made to clean the interior surfaces of water supply installations with the elemental chlorine used to disinfect drinking water. Likewise, mineral acids alone were found not to satisfactorily clean the interior surfaces.

When organic acids such as lactic acid or formic acid were tried, the results were better than with chlorine and organic acids, but still inadequate. Finally, solutions of citric acid, heated to approximately 60° C., were discovered to render relatively satisfactory cleaning. German Pat. No. 20 40 546.

However, the method of the German '546 patent suffered from serious drawbacks. First, preheating the treatment solution to 60° C. uses valuable energy inefficiently as substantial heat is lost to the environment. This problem is exacerbated when cleaning, for example, wells, pipes, or other sunken water supply installations, and reservoirs. Second, according to the German '546 patent, only ascorbic acid leads to acceptable results at normal temperatures, and even large amounts of ascorbic acid are not able to remove particularly stubborn incrustations such as nodular sintered deposits.

Third, the use of ascorbic acid, indeed any organic acid, creates a substantial increase in biochemical oxygen demand (BOD) such that the discharge of such cleaning solutions into outfall ditches is prohibited even after neutralization. Finally, in the course of the oxidizing decomposition of organic acids to carbon dioxide, the iron, calcium, and manganese cations bound in them are released, and thereby available for the formation of new deposits.

German Pat. No. 25 20 988 discloses a process for the removal of boiler scale and/or sludge. It should be noted that the composition of these deposits, i.e., little iron and no manganese, differs substantially from the ocherous and sinter deposits removed by the process of the present invention. In the process of the German '988 patent, a two-step treatment is performed wherein the boiler is flushed or treated with an acid solution, followed by treatment with a pure hydrogen peroxide solution. The acid treatment loosens the scale or sludge so that it becomes porous. The hydrogen peroxide treatment bursts the scale or sludge as the hydrogen peroxide penetrates into the pores and dissociates catalytically on the sharp-edged surfaces and/or by the presence of heavy metals. In view of the elemental composition of scale and sludge, no redox reactions occur between the hydrogen peroxide and the substances to be removed. The process of the German '988 patent suffers from the disadvantage that it is a two-step process. More importantly, the process is only slightly effective in removing the manganese-containing incrustations which are readily removed by the process of the present invention.

It is therefore an object of the present invention to provide a process for the efficient removal of solid deposits, particularly manganese-containing incrustations, from the interior surfaces of water supply installations, that may be carried out with a single solution at environmental temperature, and which uses inexpensive, generally available solution components. Furthermore, it is an object of the present invention to provide the aforedescribed efficient removal without a concomitant increase in the biochemical oxygen demand in the outfall facilities.

SUMMARY OF THE INVENTION

The present invention provides a process for the treatment of the interior surfaces of water supply installations by the removal of solid deposits therefrom, comprising applying to the installations an aqueous solution of a mineral acid and hydrogen peroxide.

The present invention also provides a treating solution used to remove calcium-, iron-, manganese-containing incrustations or mixtures thereof from the interior surfaces of water supply installations, comprising:

(a) between about 6 and about 50 percent by weight of 30 to 33 percent hydrochloric acid;

(b) between about 0.05 to about 20 percent by weight of hydrogen peroxide;

(c) between about 0.5 to about 3.0 percent by weight of anionic, cationic, neutral detergents or mixtures thereof;

(d) between about 0.5 to about 3.0 percent by weight of organic carboxylic acids, organic hydroxy acids, sulfonic acids, or mixtures thereof;

(e) between about 0.5 to about 3.0 percent by weight of at least one lower aliphatic alcohol; and (f) the balance water.

DETAILED DESCRIPTION OF THE INVENTION

The process of the present invention generally concerns the use of aqueous solutions of a mineral acid hydrogen peroxide to remove solid deposits from the interior surfaces of water supply installations, and the treating solutions themselves. In particular, the process of the present invention concerns the removal of iron-, calcium-, manganese-containing incrustations, or mixtures thereof, from the interior surfaces of water supply installations wherein a mineral acid solution containing dissolved hydrogen peroxide is prepared and applied to the incrusted interior surfaces.

Of course, the solution may be made and applied in different locales so that, for example, the preparation of a solution intended for the process of the present invention is by a producer while the solution is applied by one skilled in the art of the treatment of water supply installations.

The present inventors have surprisingly discovered that the prior art's difficulties in the removal of ocherous and sinter deposits from the interior surfaces of water supply installations may be overcome if mineral acid-containing, aqueous hydrogen peroxide solutions are used. The application of such solutions, even with remarkably low $H_2O_2$ concentrations, to the aforedescribed deposits leads to the immediate and unexpectedly satisfactory thorough cleaning without residue of ochered and/or sintered wells, pipes and storage facilities. Even the dreaded nodular and aged incrustations are decomposed effortlessly and pass into solution. It is a particular advantage of the process of the present invention that the solutions may be applied to the incrusted walls by simple spraying. The immediate discoloration of the dark deposits and their decomposition are readily observed. A further highly essential advantage of the use of a mineral acid containing aqueous hydrogen peroxide solution is the accompanying reliable antiseptic effect and the elimination of, for example, slime and algae. The process according to the present invention thus simultaneously acts to sterilize the treated water supply installations so that, in comparison to other cleaning methods, the additional use of disinfecting agents and other biocidical means are eliminated.

A further advantage of the present invention consists of the fact that the use of hydrogen peroxide, which finally forms water in its reactions, does not introduce foreign substances into the installations, and thereby avoids contaminating the water.

In the process of the present invention, the aqueous solution of mineral acid contains about 0.05 to about 20%, preferably about 0.1 to about 3% by weight hydrogen peroxide. The mineral acid concentration may be from about 0.001N to 6N, preferably from about 0.5N to about 4.5N, at most preferably from about 0.5N to 3N, with respect to the proportion of water contained in the system.

Suitable mineral acids include, for example, hydrochloric acid and sulfuric acid; hydrochloric acid is preferred.

The present treating solutions may contain conventional additives to improve their effect. Thus, aqueous mineral acid hydrogen peroxide solutions according to the invention may be combined, depending on the application, with emulsifiers, wetting agents and stabilizers, and corrosion inhibitors. Typical compositions contain, for example, between about 0.5 to about 3.0% by weight, anionic and/or cationic and/or neutral detergents, organic acids in the form of carboxylic acids, hydroxy acids or sulfonic acids, wetting agents and/or lower aliphatic alcohols.

A typical preferred treating solution according to the present invention consists of 6 to 50% by weight of 30 to 33% hydrochloric acid, 0.05 to 20% by weight hydrogen peroxide, 0.5 to 3.0% by weight anionic and/or cationic and/or neutral detergents, 0.5 to 3.0% by weight organic carboxylic acids and/or hydroxy acids and/or sulfonic acids, 0.5 to 3.0% by weight one or several lower aliphatic alcohols, and the balance water.

The following Examples are given as specific illustrations of the invention. It should be understood, however, that the invention is not llimited to the specific details set forth in the Examples. Also, all percentages are by total weight of the solution unless otherwise stated.

EXAMPLE 1

A scratch resistant, black deposit consisting of a high content of oxidic manganese, sintered lime and a low content of oxidic iron, was found on the walls of a potable water reservoir which had not been treated since 1968. The deposit was practically not attacked by half strength hydrochloric acid. However, when the deposit was sprayed with approximately 0.7 liter per square meter of a treating solution containing 0.9% by weight hydrogen peroxide and 0.5% by weight of a wetting agent based on polyethylene glycol in 2N hydrochloric acid, it lost its coherence with immediate discoloration even during the spraying process, and was flushed away for the most part. An immediately following water flush completely removed all residues completely.

EXAMPLE 2

A water pipe with a length of approximately 6 m, ochered with deposits containing primarily iron and manganese, was rinsed for approximately 30 minutes with a treating solution consisting of 3% by weight hydrogen peroxide, 0.8% by weight wetting agent, and 1.0% by weight isopropanol in 3N hydrochloric acid. The pipe was subsequently flushed free with water. A short second cleaning process with the solution according to the invention followed by another waer rinse completely removed all residues of deposits remaining after the first treatment.

EXAMPLE 3

An example of an embodiment of the present invention for a treating solution has the following composition:

(a) 0.5 to 3.0% by weight hydrogen peroxide;
(b) 20 to 48% by weight 30 to 33% by weight hydrochloric acid;
(c) 0.5 to 1.0% by weight of a mixture of polyglycol ethers;
(d) 0.5 to 1.0% by weight of a mixture of laurylpyridinium-bisulfate and lauryldimethyl-benzylammonium-chloride;
(e) 2.5 to 3.0% by weight citric acid;
(f) 0.5 to 1.0% by weight isopropylalcohol; and
(g) the balance water.

Such a solution may be industrially preproduced and is storable in large quantities. With a hydrochloric acid content of 30 to 35% by weight, it is especially suitable for the treatment of normal incrustations, while higher acid contents may be chosen, if particularly stubborn, highly aged incrustations are to be treated.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for the treatment of interior surfaces of water supply installations to remove therefrom solid manganese-containing ocherous and sinter deposits formed by microorganisms known as iron and manganese bacteria from water that originates from natural sources, comprising the steps of applying to said interior surfaces of said installations an aqueous solution of hydrochloric acid and hydrogen peroxide, the concentration of said hydrochloric acid in said solution being between about 0.001 and about 6N and the hydrogen peroxide being present in an amount of between about 0.05 and about 20 percent by weight.

2. The process according to claim 1, wherein the concentration of said hydrochloric acid in said solution is between about 0.5 and about 4.5N, and wherein hydrogen peroxide is present in an amount between about 0.1 and about 3 percent by weight.

3. The process according to claim 1, wherein said solution further contains additives selected from the group consisting of anionic, cationic, and neutral detergents, organic acids, lower aliphatic alcohols, and mixtures thereof.

4. The process according to claim 1, wherein said solution is applied to said interior surfaces at environmental temperature.

5. The process according to claim 1, wherein said solution is sprayed onto said interior surfaces of said installations.

6. The process according to claim 1, wherein said installations to be treated are rinsed with said solution.

7. The process according to claim 1, wherein said deposits further include calcium or iron or mixtures thereof.

* * * * *